April 28, 1970 A. MARZOCCHI 3,508,950

METHOD OF COMBINING GLASS FIBERS AND RUBBER

Filed Sept. 6, 1966

INVENTOR.
Alfred Marzocchi
by Staelin & Overman
Atty's

United States Patent Office 3,508,950
Patented Apr. 28, 1970

3,508,950
METHOD OF COMBINING GLASS FIBERS AND RUBBER
Alfred Marzocchi, Cumberland, R.I., assignor to Owens-Corning Fiberglas Corporation, a corporation of Delaware
Filed Sept. 6, 1966, Ser. No. 594,298
Int. Cl. C03c 25/02
U.S. Cl. 117—72
15 Claims

ABSTRACT OF THE DISCLOSURE

The manufacture of glass fiber reinforced elastomeric products wherein the glass fiber surfaces are coated or bundles of the glass fibers are impregnated with an elastomeric component which is worked in the presence of an anchoring agent for reaction of the anchoring agent with reactive sites as they are released upon thermal breakdown of the rubber to form a rubber-anchoring agent reaction product which serves strongly to bond the elastomeric phase to the glass fibers.

---

This invention relates to the combination of glass fibers with rubber and the like elastomeric materials and it relates more particularly to elastomeric materials reinforced with glass fibers in the manufacture of glass fiber reinforced elastomeric products, such as vehicle tires, drive belts, conveyor belts, rubberized fabrics, tank linings, and the like.

Glass fibers constitute a class of materials which should find excellent use as a reinforcement for elastomeric materials because glass fibers are characterized by exceptionally high strength in tension, inertness to moisture, chemical corrosive gases and the like, resistance to rot or fungus attack, excellent electrical resistance, low heat conductivity, and glass fibers retain their fibrous characteristics at temperatures far above that at which elastomeric materials would begin thermally to decompose. However, a number of problems have been faced in the attempt to make use of glass fibers as a reinforcement. Glass fibers form naturally into thin, rod-like members which have perfectly smooth surfaces so that there is little available onto which a continuous phase material can grasp for physical attachment between the solid, rod-like glass fibers and the material forming the continuous phase. Lacking the ability to establish a strong and permanent physical bond, consideration has been given to the harnessing of physical chemical forces for the establishment of a strong and permanent bonded relationship with glass fiber surfaces. Here the problem is aggravated by the fact that groupings that predominate on the surfaces of the solid rods of glass fibers are hydrophilic, water-loving groups so that a very tenacious water film forms on the surfaces of the glass fibers, especially when exposed to high humidity conditions, whereby the interlayer of water interferes with the establishment of a strong and permanent bond between the continuous phase material and the glass fiber surfaces.

In the absence of the ability to establish a strong and permanent bonded relationship between the glass fiber surfaces and the continuous phase material, full utilization cannot be made of the high strength and others of the properties of the glass fibers when used as a reinforcement.

Considerable work has been performed over the past twenty years in overcoming this problem between glass fiber surfaces and synthetic resinous materials in the manufacture of glass fiber reinforced plastics, laminates, and coated fabrics. Because the groupings predominating in the synthetic resinous materials are not hydrophilic, the water layer formed on the glass fiber surfaces operates to displace any bond that might have been established between the glass fiber surfaces and such synthetic resinous materials. The solution that has evolved resides in the use of an anchoring agent capable of interbonding the synthetic resinous material with the glass fiber surfaces wherein the anchoring agent contains one structure which is capable of a strong and permanent bond to the glass fiber surfaces while other groups of the anchoring agent are available to effect a strong and permanent attachment to the synthetic resinous material with which the glass fibers are bonded in the manufacture of glass fiber reinforced resinous products.

It was found that there was no universal anchoring agent that was suitable for all resinous materials, for example, an unsaturated organo silicon compound, such as vinyl trichlorosilane, was suitable for use with unsaturated polyester resinous materials but not as suitable for resins that are polymerized by condensation, such as the phenolic resins, urea formaldehyde resins, epoxy resins and the like. Similarly, while organosilicon compounds having free hydroxy, amino or carboxyl groups on the organic group permanently attached to the silicon atom gave excellent use in the combination of glass fibers with resinous materials that polymerize by condensation, such organosilicon compounds had very little beneficial effect with resins formed by addition polymerization through ethylenic unsaturation.

It has been found that the problems of establishing a strong and permanent bonded relationship between glass fibers and elastomeric or rubber materials are not capable of solution with the materials that have been found suitable for the combination between glass fibers and synthetic resinous materials. The difference is, of course, understandable when it is appreciated that rubber differs structurally from synthetic resinous materials and that its reaction for vulcanization or cure does not find its counterpart in the synthetic resinous art. As a result, the development of a strong and permanent bonded relationship between glass fiber surfaces and rubbers or other elastomeric materials poses an entirely new problem which required an independent research program which does not rely on concepts heretofore developed for synthetic resinous systems.

Thus it is an object of this invention to produce and to provide a method for producing glass fiber reinforced elastomeric products and treated glass fiber system for use in the manufacture of same and it is a related object to provide compositions for use in the treatment of glass fibers to enhance their bonded relationship with elastomeric materials.

More specifically, it is an object of this invention to produce and to provide a method for producing sized glass fibers and/or impregnated bundles of glass fibers wherein the sized glass fibers or bundles are adapted for use in combination with elastomeric materials to establish a strong and permanent bonded relationship therebetween in the manufacture of glass fiber elastomeric products.

These and other objects and advantages of this invention will hereinafter appear and for purposes of illustration, but not of limitation, embodiments of the invention are shown in the accompanying drawings in which—

Figure 1:
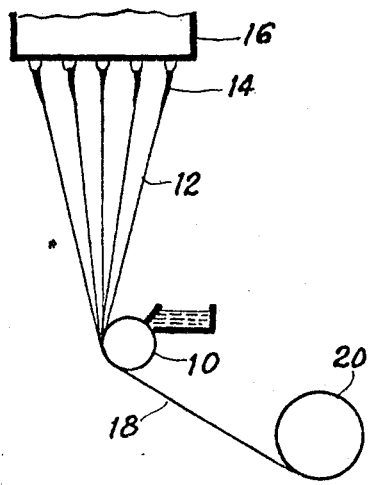
FIG. 1 is a diagrammatic view of a fiber forming and coating process employed in the practice of this invention.
Figure 2:
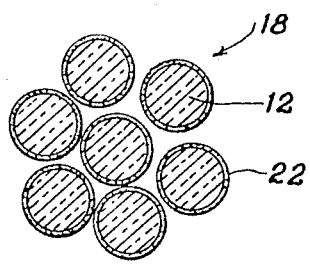
FIG. 2 is a cross-sectional view through a portion of a strand of glass fibers produced in accordance with the process of FIG. 1.

As used herein, the term "glass fibers" is meant to refer to continuous glass fibers in the form of filaments or bundles of glass fibers such as strands, yarns, cords or fabrics formed thereof in the form of woven or nonwoven fabric. Included also are discontinuous or staple glass fibers and bundles formed thereof such as yarns and fabrics formed thereof, or discontinuous fibers which have been reduced to short lengths of 1/16 inch in length or more, as by cutting or chopping. Included also are crimped continuous or discontinuous glass fibers or bundles of glass fibers and combinations of crimped and uncrimped continuous or discontinuous glass fibers and bundles formed thereof.

The term "elastomer," as used herein, includes synthetic elastomeric materials such as neoprene, isoprene, chloroprene, butyl rubber and the like, and copolymers thereof with acrylonitrile, styrene, butadiene and the like, and natural rubbers and derivatives thereof such as chlorinated rubber or rubber hydrochloride.

An important concept of this invention resides in the discovery that when the elastomer is subjected to milling under heat and pressure, the rubber molecule breaks down to free highly reactive nascent groups which remain as a part of the rubber molecule but which are capable of reaction with orgno silicon compounds or Werner complex compounds whereby such anchoring agents are integrated to form a part of the elastomeric molecule while, at the same time, retaining their reactivity by which such organo silicon or Werner complex compound anchoring agents are capable of strong and permanent attachment to the glass fiber surfaces. Thus the elastomer molecule becomes strongly and permanently attached to the glass fibers. The mechanism by which the described relationship is established has not yet been developed but it is evident that the bonded relationship between such milled elastomeric material and the glass fiber surfaces differs in kind rather than degree from the lesser bonded relationship that is established between glass fibers and the same elastomeric materials in the absence of milling even when the same anchoring agent is present in corresponding amounts in each system.

It is believed that the cleavage of the rubber molecule under heat and pressure operates to activate groupings such as the halogen or the hydrogen halides of the rubber or other nascent groupings that are formed to render the rubber molecule more receptive or more reactive with groupings of the organo silicon compound, Werner complex compound or the like anchoring agent whereby the latter becomes a part of the elastomeric molecule. Thus it is the entire rubber molecule which thereafter functions as the anchoring agent that becomes strongly and permanently bonded to the glass fiber surfaces.

The desired results can be achieved in a number of ways. In the preferred practice of this invention, the organo silicon anchoring agent can be incorporated as a component with the elastomer or added to the elastomer during the milling operation thereby to make the organo silicon compound immediately available for reaction at the time that the rubber molecule is broken down and while the nascent groups are still in their most reactive state. For this purpose, it is sufficient when the organo silicon anchoring agent is present in an amount within the range of .1 to 5 percent by weight and preferably .5 to 2 percent by weight of the elastomer.

The elastomer containing the anchoring agent as a part thereof can be employed alone or in combination with other ingredients as a size composition applied directly to the glass fiber surfaces during forming or after a previously applied size has been removed, but it is preferred to formulate the elastomer-anchoring agent component into a composition for introduction as an impregnant of previously formed bundles of glass fibers in yarn, cord or fabric form to provide an integrated structure which can be used as a reinforcement for elastomeric systems in the manufacture of glass fiber reinforced elastomeric products such as tires, belts, sheeting, and the like.

The following examples are given by way of illustration, but not by way of limitation, of the foregoing concepts of the invention in which the organo silicon anchoring agent is reacted with an elastomeric material for use as a component in a glass fiber size or a glass fiber impregnant.

EXAMPLE 1

| | Percent by wt. |
|---|---|
| Natural rubber | 99 |
| Vinyl trichlorosilane | 1 |

The natural rubber is milled between rolls heated to a temperature of 250–350° F. in the conventional manner for milling to break down the rubber molecule. During the milling operation, the vinyl trichlorosilane is introduced and thoroughly distributed throughout the rubber during the milling process. When the desired amount of breakdown has been achieved (about 20–60° minutes) the resulting elastomer-anchoring agent is removed and dispersed in aqueous medium to form a latex. This can be accomplished by dissolving the silanized rubber in conventional rubber solvents such as benzene to a concentration of about 20% solids and forming the solution into an aqueous emulsion with emulsifying agents such as ethylene oxide condensates, sorbitan monooleate or non-ionic emulsifiers such as ammonium oleate, with the emulsifier present in an amount within the range of 0.1% to 1.0% by weight.

For use as a size, the latex is diluted to .5% by weight solids and applied by a roller coater 10 to the individual glass fiber filaments 12 as they are formed by rapid attenuation of molten streams 14 of glass issuing from the bottom side of glass melting furnace 16 and gathered together into strands 18 which are wound upon a rapidly rotating drum 20.

The individual glass fiber filaments 12 are wet with the size composition whereby each of the filaments in the glass fiber bundle 18 is coated with an infinitely thin size layer 22 of the elastomer-silane product.

To minimize the seizure of the sized glass fibers during subsequent processing into strands, yarns, cords or fabrics, as by the technique of plying, twisting and weaving, it is desirable though not essential to coat the sized glass fibers or bundle formed thereof with a fine dust such as zinc stearate, milled fiber such as cotton or synthetic organic resinous fibers, silica dust, graphite, carbon black, zinc oxide and the like finely divided powders which will operate to impart lubricity but which can be tolerated in the elastomeric product by way of a filler or reactant during cure or vulcanization of the elastomer during product formation thereby to avoid the necessity for removal of the applied powder prior to combination of the glass fibers with the elastomer forming the continuous phase of the glass fiber-elastomeric product. The dust or powder can be applied onto the glass fibers or bundles merely by dusting onto the sized fibers or by advancing the fibers through a mound of the dust before winding onto the roller 20.

It is preferred to formulate the elastomer-silane component of Example 1 into a composition with which formed bundles of glass fibers can be impregnated, preferably though not essentially after the original size has been removed. When used as an impregnant, the composition penetrates into the bundle of glass fibers to coat individual fibers to establish a strong and permanent bonded relationship therewith. Impregnation of the glass fiber bundles also serves to fill the bundle with impregnating composition whereby the fibers are cushioned by the elastomeric material to maximize utilization of the desirable properties of the glass fibers since the fibers are capable of relative movements sufficiently to align the fibers whereby more of the fibers are made available to resist shear in stress. The elastomeric impregnant also operates to protect the fibers one from another to prevent destruction by mutual abrasion. Impregnation also serves to enhance the integration of the fibers with the elastomeric material with which the bundles of glass fibers are to be combined in the manufacture of the reinforced product since the elastomeric component present as an impregnant or as a coating on the glass fibers is capable of full integration with the elastomeric material of the continuous phase thereby to integrate the entire bundle of glass fibers with the elastomer to give more effect to the glass fibers as a mass as distinguished from the individual components.

For this purpose, the anchoring agent should be present in an amount greater than that employed in a size composition. Beneficial results are secured by impregnation when the organosilicon anchoring agent is present as a component of the elastomer in an amount greater than .4% by weight up to about 8% by weight and preferably in an amount greater than .8% by weight up to 4% by weight of the elastomer.

Instead of forming a latex of the milled elastomer-anchoring agent of Example 1, th emilled product is taken into solution in a suitable solvent such as naphtha, benzene, toluene and the like to form a 20% solution. An impregnating composition can be formulated as follows:

EXAMPLE 2

| | Parts by wt. |
|---|---|
| Natural rubber | 100 |
| Gamma-aminopropyltriethoxy silane | 1 |
| Stearic acid | 2 |
| Zinc oxide | 3 |
| Circosol 2XH | 6 |
| Carbon black | 40 |
| Flexzone 3C | 1.5 |
| BLE 25 | 0.3 |
| Retarder W | 0.5 |
| Santocure MOR | 0.6 |
| Sulphur | 2.5 |

In the formulation of the composition of Example 2, the stearic acid is added to the rubber during the banburying and after one minute the carbon black, zinc oxide, Flexzone, BLE, Retarder W and the gamma-aminopropyltriethoxy silane are added while continuing the mixing for about 1½ minutes, and then the Circosol 2XH is added with additional mixing for 2 minutes. The material is cooled down and the sulphur and Santocure are separately added by a conventional milling operation using a two-roll mill.

The foregoing stock is formed into a 10–20% latex by dispersion in aqueous medium.

Figure 3:
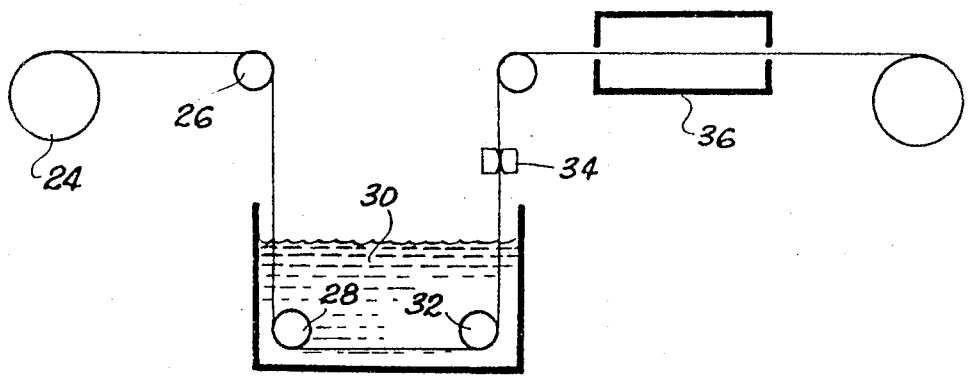
FIG. 3 is a diagrammatic view of the process for impregnation of bundles of glass fibers in accordance with the practice of this invention.
Figure 4:
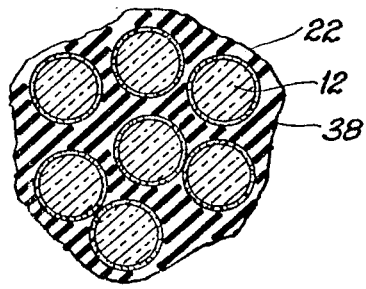
FIG. 4 is a cross-sectional view of a fragmentary portion of a bundle of glass fibers impregnated by the process of FIG. 3.

Referring now to FIG. 3, the glass fibers, in the form of strands or yarns, are unwound from a spool 24 and advanced continuously over rollers 26 and 28 into a bath 30 containing the impregnating composition of Example 2. From the bath 30, the impregnated bundle of glass fibers is passed upwardly about the roller 32 through a wiper or die 34 in which the excess impregnating composition is removed from the glass fiber bundle and wherein the impregnating composition is worked more completely into the bundle of glass fibers more effectively to coat the surfaces of the individual glass fiber filaments.

The bundle of glass fibers is thereafter advanced through a drying oven 36 maintained at an elevated temperature, such as at a temperature within the range of 250–400° F., to remove diluent and to advance the cure or vulcanization of the elastomeric material in the impregnating composition preferably to a stage less than the cured or vulcanized state but which may be carried to the cured or vulcanized state to leave an elastomeric coating 38 on the glass fiber surfaces. For this purpose, it is undesirable to heat the elastomer to a temperature above 200–250° F. for any length of time.

It is desirable to achieve as complete impregnation of the glass fiber bundles as is possible. Impregnation can be enhanced by the technique of flexing or bending the bundles of glass fibers while in the bath 30 of the impregnating or while wet with the impregnating composition as by sharply bending the bundle of glass fibers over the rollers 28 and 32 and the like. Instead, or in combination therewith, fuller impregnation can be achieved by the use of pressure dies or by advancement of the glass fiber bundle through dies which provide for pulsations between high and low pressures progressively to work the impregnating composition into the interior of the bundle while withdrawing entrapped gases, or by passage of the glass fiber bundle, wet with the impregnating composition, through a series of dies for alternately constricting and flexing the bundle to open the bundle, or by the technique of using ultrasonics for vibration of the bundle of glass fibers during impregnation.

The impregnated bundles of glass fibers can be used as such for subsequent combination with the elastomeric material forming the continuous phase of the glass fiber reinforced product or, in the preferred practice of the invention, the bundles of glass fibers impregnated with the elastomer-anchoring agent can be dusted with silica dust, mica dust, zinc oxide powders, graphite, zinc stearate, and the like, as previously described, to enhance the lubricity of the impregnated bundles of glass fibers during subsequent processing into the condition desired for use as the reinforcement.

In accordance with another concept of this invention, the rubber can be milled to effect molecular breakdown and to free reactive groups while the anchoring agent and the glass fiber component are all in combination therewith. For this purpose, the anchoring agent can be incorporated as a component separate and apart from the glass fibers, but it is preferred to incorporate the anchoring agent with the glass fibers as a coating previously applied to the glass fiber surfaces. When present as a coating on the glass fiber surfaces, the anchoring agent is concentrated at the surface where maximum utilization can be made of the organosilicon compound to tie in the elastomer with the glass fiber surfaces. Thus when the organosilicon compound is incorporated as a component separate and apart from the glass fibers, the amount of anchoring agent should be increased to within the range of .5% to 5% by weight of the elastomer. When incorporated as a coating on the glass fiber surfaces it is sufficient if the amount of organosilicon compound is within the range of .1% to 2% by weight of the elastomer although more can be employed but it is impractical to make use of an amount greater than 5% by weight.

EXAMPLE 3

| | Parts by wt. |
|---|---|
| Natural rubber | 100 |
| Stearic acid | 2 |
| Zinc oxide | 3 |
| Circosol 2XH | 6 |
| Carbon black | 40 |
| Flexzone 3C | 1.5 |
| BLE 25 | 0.3 |
| Retarder W | 0.5 |
| Santocure MOR | 0.6 |
| Sulphur | 2.5 |
| Gamma-aminopropyltriethoxy silane | 2 |
| Glass fibers | 10 |

In preparation, the rubber is banburyed for ½ minute, the stearic acid is added and banburyed for an additional minute, the carbon black, zinc oxide, Flexzone 3C, BLE 25 and Retarder W and the gamma-aminopropyltriethoxy silane are added with additional mixing for 1½ minutes and then the Circosol 2XH is added and mixed for 2 minutes. The material is dumped and cooled to ambient temperature and then the sulphur and Santocure MOR are added during conventional milling. The glass fiber component is added with the sulphur and accelerator during the milling operation, with a small proportion added during the initial stages of the milling operation and the remainder admixed towards the end of the milling operation.

Figure 5:
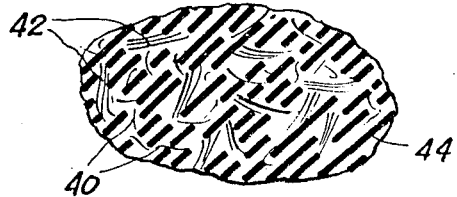
FIG. 5 is a schematic sectional view of a molding compound prepared in accordance with the practice of this invention.

The sequence of additions of the bundles of glass fibers is for the purpose of achieving a desired distribution of glass fibers in the elastomeric material wherein the bundles of fibers added during the early stages of the milling operation will have become separated more than the bundles of glass fibers added during the subsequent stage of the milling operation with the result that the milled product, as illustrated in FIG. 5, will represent glass fiber reinforced elastomeric compound that can be molded to the desired shape of the end product with the fibers present as a reinforcement in the form of small increments of separated fibers 40 and larger increments of fiber bundles 42 uniformly distributed throughout the continuous phase of the elastomeric material 44.

A strong and permanent bonded relationship will have been established between the glass fiber surfaces and the elastomeric material by reason of the reactions taking place to break down the rubber molecule while in the presence of and in direct contact with the organo silicon anchoring agent and the glass fibers thereby to provide the reactants for establishing an interbonded relationship.

EXAMPLE 4

0.1 to 5.0 percent by weight of thiosilane

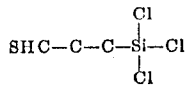

Remainder water.

The foregoing composition is applied to the glass fiber surfaces in forming or after the original size has been removed and the coated glass fibers are formed into bundles which are cut to lengths of ¼ to ½ inch.

The bundles of glass fibers are admixed with the elastomer material, such as neoprene, during the hot milling to incorporate from 2–10% by weight of glass fibers based upon the final compound. The fiber bundles can be added all at once or preferably in increments as described in Example 3 to achieve a desired distribution of separated fibers and fiber bundles throughout the milled elastomer.

The compositions formed in accordance with Examples 3 and 4 comprise molding compounds which can be compressed to desired shape for setting as by vulcanization or cure to the desired glass fiber reinforced product, as more fully described in the copending application Ser. No. 453,938, filed May 7, 1965. Beneficial results can also be achieved when the organo silicon anchoring agent is previously applied to the glass fiber surfaces for combination with elastomeric material which has previously been milled separate and apart from the anchoring agent but in which the reactive groups, formed in response to milling, are still retained in the rubber for the described combination with the organo silicon compound. For this purpose, it will be sufficient if the anchoring agent is present on the glass fiber surfaces in an amount within the range of 0.01 to 5 percent by weight of the elastomer and preferably in an amount within the range of 0.1 to 2.0 percent by weight.

EXAMPLE 5

0.01 to 5 percent by weight of allyl trihydroxy silane
Remainder water

A woven fabric of glass fibers is coronized by heating to a temperature in the range of 1100° F. in an oxidizing atmosphere to burn off the original size applied to the glass fiber surfaces and to weave set the fabric. The above composition is applied to the surfaces of the glass fibers in the fabric by a dip coat process and then dried.

In a separate operation, isoprene is milled at a temperature of about 250–290° F. between pressure rolls for about 20–60 minutes to break down the rubber molecule.

The fabric of glass fibers is plied with thin layers of the milled elastomeric material and the composite is cured or vulcanized under heat and pressure to form the desired cured product, such as a rubber sheet, molded belt or tire. The desired interbonded relationship will occur during the cure of the elastomer while in intimate contact with the coated glass fibers whereby the organo silicon compound reacts with the grouping available in the milled elastomer to tie in with the elastomer for anchorage of the elastomer to the glass fiber surfaces of the fabric. Excellent results have also been secured in accordance with the concepts of this invention in effecting a strong bonding relationship between butyl rubber and glass fibers and with others of the organic resinous fibers, such as rayon, nylon, polyamide and polyester fibers, as illustrated by the following example.

EXAMPLE 6

| | Parts by wt. |
|---|---|
| Butyl rubber | 100 |
| Carbon black | 35 |
| MT black | 15 |
| Sun 516 oil | 8 |
| Elastopar | .8 |
| Zinc oxide | 5 |
| Tellurac | 1.6 |
| MBTS | 1 |
| Amberol ST137x | 7 |
| Sulphur | 2 |
| Gamma-aminopropyltriethoxy silane | 1.5 |

In preparation, the butyl rubber is banburied for 1½ minutes. The Elastopar is added with mixing for an additional ½ minute. One-half of the carbon black, all of the oil, zinc oxide and all of the gamma-aminopropyltriethoxy silane are added with additional banburying for 2 minutes. The remainder of the carbon black and the Amberol ST137x are added with additional mixing for 3 minutes until the temperature is between 280° and 300° F. The material is dumped from the banbury and the stock is cooled for a minimum of two hours. Then during mixing in a two roll mill, the sulphur, the MBTS and the Tellurac are added.

In the foregoing examples, it will be understood that elastomers other than those specified in the examples may be employed in substitution therefor. Similarly, other organosilicon compounds such as the silanes, in which the unhydrolyzable group attached to the silicon atom contains less than 8 carbon atoms and a functional group, such as a hydroxy group, carboxy group, halogen group, amino group, thio group, ethylenic group, epoxy group, cyano group and the like, their hydrolysis products (silanols) or their polymerization products (polysiloxanes) can be substituted in like amounts for the organosilicons specified in each of the examples. It will be understood also that the organo silicon compounds of the foregoing examples can be replaced in corresponding amounts by Werner complex compounds in which the carboxylate group coordinated with the trivalent nuclear chromium atom is a short chain group of less than 8 carbon atoms and which contains a highly functional group of the type previously described with reference to the silanes.

By reason of the effect on viscosity, it is difficult to incorporate an amount of glass fibers in admixture with the continuous phase of the elastomeric material in which the glass fiber concentration in the final product will exceed 20% by weight. When the glass fibers are not admixed with the elastomeric material but are otherwise embodied therewith in the form of cords or fabrics which are laid down in positions for integration with the elastomeric material, the glass fiber concentration can be increased to as much as 50–60% by weight of the final product. Very often it is desirable to make use of the combination of a molding compound of an elastomeric material in which the glass fibers of lengths ranging from 1/16 to 1½ inches are uniformly distributed in the elastomeric material, as in Examples 3 and 4, and glass fibers, cords or fabrics which are positioned separately for combination with the molding compound in the manufacture of the glass fiber reinforced final product.

As used herein, the term "milling" includes working the elastomer while under heat and pressure sufficient to bring about thermal breakdown of the rubber molecule to release reactive sits and includes such working procedures as extrusion, banburying, calendering, milling between pressure rolls and the like.

It will be understood that changes may be made in the details of formulation and operation as well as in the combination to form various products of the glass fiber reinforced elastomeric materials without departing from the spirit of the invention.

I claim:

1. In the fabrication of a product embodying a continuous phase of an elastomeric material and glass fibers present as a dispersed phase in the elastomeric material, the improvement whereby a strong and permanent bonded relationship is established between the surfaces of the dispersed glass fibers and the elastomeric material of the continuous phase comprising the steps of milling an elastomer under heat and pressure to effect breakdown of the elastomer molecule to form therein reactive sites reactable with an anchoring agent, carrying out at least a portion of said milling operation in the presence of said anchoring agent in intimate contact with the elastomer for reaction at said reactive sites as they are formed, whereby said anchoring agent becomes a part of the elastomer molecule to provide a rubber-anchoring agent reaction product, said anchoring agent being selected from the group consisting of (1) an organo silicon compound in the form of a silane, its hydrolysis product or its polymerization product in which an unhydrolyzable group attached to the silicon atom of the organosilane contains from 1 to 8 carbon atoms and a functional group selected from the group consisting of hydroxy, carboxy, halogen, amino, thio, ethylenic, epoxy and cyano, and (2) a Werner complex compound in which the carboxylato group coordinated with the trivalent nuclear chromium atom has less than 8 carbon atoms and contains a functional group selected from the group consisting of hydroxy, carboxy, halogen, amino, thio, ethylenic, epoxy and cyano, and combining the reaction product with the glass fibers whereby the elastomer-anchoring agent becomes strongly anchored to the glass fiber surfaces to tie in the elastomer with the glass fibers.

2. The process as claimed in claim 1 in which the anchoring agent is embodied in the elastomer before milling.

3. The process as claimed in claim 1 in which the anchoring agent is added to the elastomer during milling.

4. The process as claimed in claim 1 in which the anchoring agent and glass fibers are added to the elastomer before milling whereby the milling operation is performed simultaneously on the glass fibers, anchoring agent and elastomer system.

5. The process as claimed in claim 4 in which the anchoring agent is present as a coating on the glass fiber surfaces at the time that the anchoring agent and glass fibers are added to the elastomeric material.

6. The process as claimed in claim 1 in which the anchoring agent and glass fibers are added to the elastomer during the milling operation.

7. The process as claimed in claim 1 in which the anchoring agent and glass fibers are added to the elastomer as separate components.

8. In the fabrication of a product embodying a continuous phase of an elastomeric material and glass fibers present as a dispersed phase in the elastomeric material, the improvement wherein a strong and permanent bonded relationship is established between the surfaces of dispersed glass fibers and the elastomeric material of the continuous phase, comprising the steps of working an elastomer under heat and pressure to effect breakdown of the elastomer molecule to form therein reactive sites reactable with an anchoring agent, carrying out at least a portion of said milling operation in the presence of said anchoring agent in intimate contact with the elastomer for reaction at said reactive sites as they are formed, whereby said anchoring agent becomes a part of the elastomer molecule to provide a rubber-anchoring agent reaction product, said anchoring agent being selected from the group consisting of (1) an organosilicon compound in the form of a silane, its hydrolysis product or its polymerization product in which an unhydrolyzable group attached to the silicon atom of the organosilane contains from 1 to 8 carbon atoms and a functional group selected from the group consisting of hydroxy, carboxy, halogen, amino, thio, ethylenic, epoxy and cyano, and (2) a Werner complex compound in which the carboxylato group coordinated with the trivalent nuclear chromium atom has less than 8 carbon atoms and contains a functional group selected from the group consisting of hydroxy, carboxy, halogen, amino, thio, ethylenic, epoxy and cyano, formulating the elastomer-anchoring agent into a glass fiber size, sizing the glass fibers with the elastomer-anchoring agent, and then combining the sized glass fibers with the elastomeric material forming the continuous phase.

9. The process as claimed in claim 8 in which the elastomer reacted with the anchoring agent is the same as the elastomer of the continuous phase.

10. The process as claimed in claim 8 in which the elastomer reacted with the anchoring agent differs from the elastomer of the continuous phase.

11. The process as claimed in claim 8 which includes the step of coating the size glass fibers after sizing but before combination with the elastomeric material with a powdered lubricating agent to enable the sized fibers to be processed into glass fiber bundles and in which the powdered lubricating agent is compatible with the cure of the elastomer forming the continuous phase whereby it can remain on the sized glass fiber surfaces when combined with the elastomeric material of the continuous phase.

12. In the fabrication of a product embodying a continuous phase of an elastomeric material and glass fibers present as a dispersed phase in the elastomeric material, the improvement wherein a strong and permanent bonded relationship is established between the surfaces of dispersed glass fibers and the elastomeric material of the continuous phase, comprising the steps of working an elastomer under heat and pressure to effect breakdown of the elastomer molecule to form therein reactive sites reactable with an anchoring agent, carrying out at least a portion of said milling operation in the presence of said anchoring agent in intimate contact with the elastomer for reaction at said reactive sites as they are formed, whereby said anchoring agent becomes a part of the elastomer molecule to provide a rubber-anchoring agent reaction product, said anchoring agent being selected from the group consisting of (1) an organosilicon compound in a form of a silane, its hydrolysis product or its polymerization product in which an unhydrolyzable group attached to the silicon atom of the organosilane contains from 1 to 8 carbon atoms and a functional group selected from the group consisting of hydroxy, carboxy, halogen, amino, thio, ethylenic, epoxy and cyano, and (2) a Werner complex compound in which the carboxylato group coordinated with the trivalent nuclear chromium atom has less than 8 carbon atoms and contains a functional group selected from the group consisting of hydroxy, carboxy, halogen, amino, thio, ethylenic, epoxy and cyano, formulating the elastomer-anchoring agent into an impregnating composition, impregnating bundles of glass fibers with the impregnating composition, and then combining the impregnated bundles of glass fibers with the elastomeric material forming the cotinuous phase.

13. The process as claimed in claim 12 in which the anchoring agent is added to the elastomer before milling.

14. The process as claimed in claim 12 in which the anchoring agent is added to the elastomer during milling.

15. The process as claimed in claim 12 which includes the step of coating the impregnated bundles of glass fibers after impregnation but before combination with the elastomeric material with a powdered lubricating agent that enables the bundles of impregnated glass, fibers to be processed into yarns, cords or fabrics and in which the powdered agent is compatible with the cure of the elastomeric material of the continuous phase so as to permit retention of the powdered material on the surfaces of the impregnated bundle of glass fibers when combined with the continuous phase elastomeric material.

References Cited

UNITED STATES PATENTS

| 2,931,739 | 4/1960 | Marzocchi et al. | 117—126 |
| 3,252,278 | 5/1966 | Marzocchi et al. | 117—126 X |
| 3,402,064 | 9/1968 | Marzocchi | 117—126 X |

OTHER REFERENCES

Bateman, L., The Chemistry and Physics of Rubber-like Substances, John Wiley & Sons, (New York), 1963, pp. 420–421.

WILLIAM D. MARTIN, Primary Examiner

D. COHEN, Assistant Examiner

U.S. Cl. X.R.

117—76, 126